United States Patent [19]

Pena

[11] Patent Number: 5,801,646
[45] Date of Patent: Sep. 1, 1998

[54] TRAFFIC ALERT SYSTEM AND METHOD FOR ITS USE

[76] Inventor: Martin R. Pena, 11039 Painted Tree Rd., Charlotte, N.C. 28226

[21] Appl. No.: 917,628

[22] Filed: Aug. 22, 1997

[51] Int. Cl.$^6$ .............................. G08G 1/00; B60Q 7/00
[52] U.S. Cl. .................. 340/902; 340/904; 340/908.1; 340/331; 340/691
[58] Field of Search ........................ 340/902, 904, 340/901, 906, 908, 908.1, 539, 933, 944, 331, 332, 691, 825.69, 825.72

[56] References Cited

U.S. PATENT DOCUMENTS

| | | | |
|---|---|---|---|
| 2,829,362 | 4/1958 | Terrill | 340/908 |
| 4,713,910 | 12/1987 | Quante | 340/908.1 |
| 4,843,337 | 6/1989 | Conn, Jr. et al. | 340/902 |
| 4,857,921 | 8/1989 | McBride et al. | 340/902 |
| 5,552,767 | 9/1996 | Toman | 340/908.1 |

*Primary Examiner*—Donnie L. Crosland
*Attorney, Agent, or Firm*—Dorothy S. Morse

[57] ABSTRACT

A two-stage traffic alert system, and a method for its use, to visually alert pedestrians and operators of surface vehicles to the approach of emergency vehicles toward roadway intersections. A wireless signal transmitter mounted to an emergency vehicle automatically transmits a signal of a predetermined frequency while the emergency vehicle is en route to an emergency destination. The signal is received by at least one ground-based signal receiver and strobe light assembly mounted centrally within the pavement of approaching intersections. The transmitted signal first actuates an upper strobe light system within the ground-based assembly, alerting the public to the approach of the emergency vehicle toward the intersection. The initiation of the upper strobe light comprises the first stage of the traffic alert system. The second stage of the traffic alert system is initiated either by a time delay command based on the time of receipt of the first signal or a change in signal frequency from the transmitter. During second stage alert, the ground-based assembly translates vertically from the surface of the pavement and activates side mounted strobe lights while maintaining activation of the upper strobe light, further alerting the public to the approach of the emergency vehicle. The traffic alert system can be manually overridden by emergency workers as needed.

19 Claims, 3 Drawing Sheets

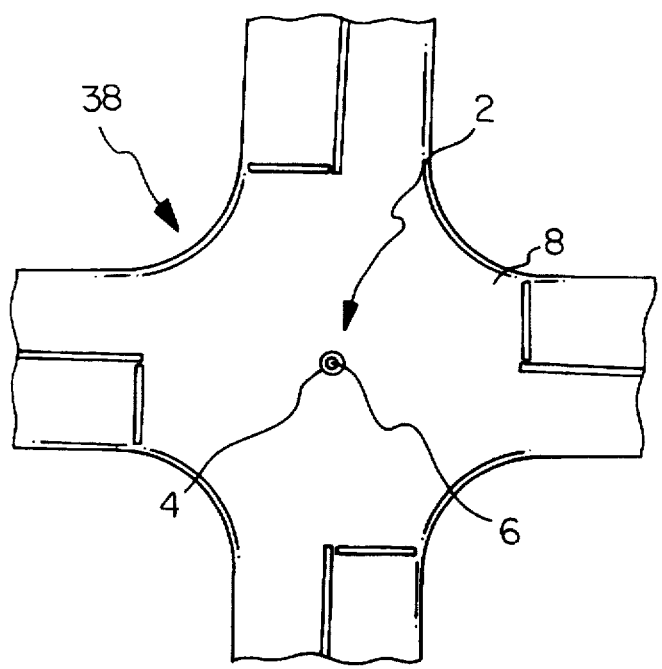
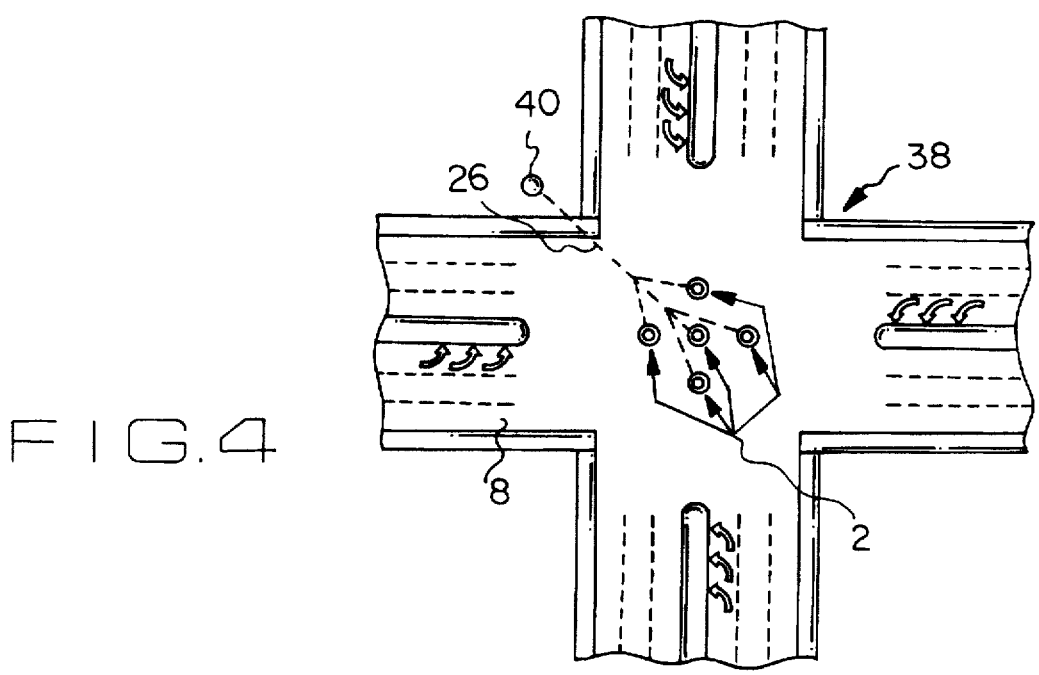

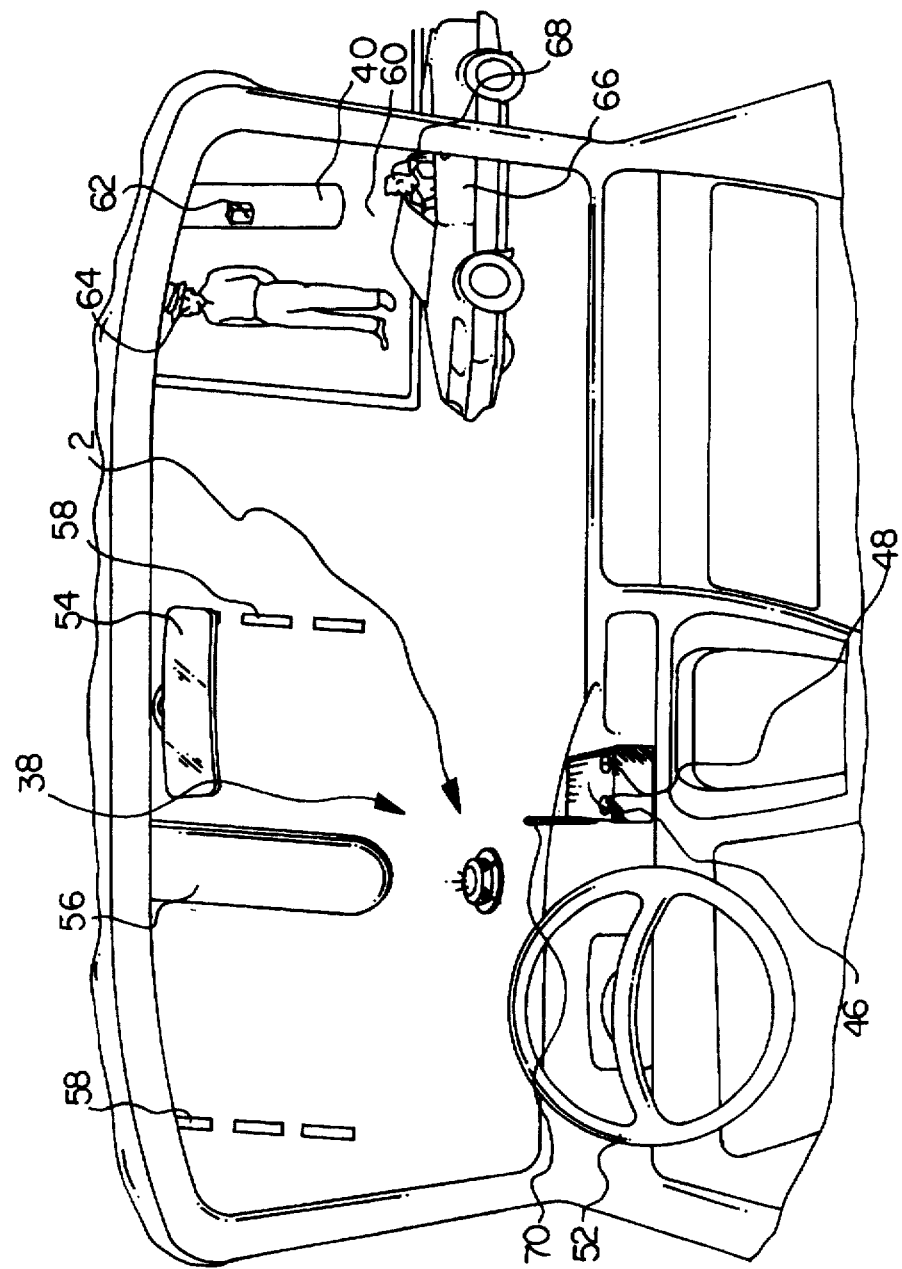

TRAFFIC ALERT SYSTEM AND METHOD FOR ITS USE

BACKGROUND

1. Field of Invention

This invention relates to visual warning systems which alert motorists and pedestrians to potential danger in and around roadway intersections, specifically to a two-stage visual warning system, and a method for its use, comprising a wireless signal transmitting unit mounted within each emergency vehicle operating within a community and a ground-based signal receiving unit centrally positioned within the road surface of each intersection routinely traveled by the emergency vehicles, each receiving unit comprising an upwardly mobile strobe light assembly to alert surface vehicles and pedestrians near the intersection to the approach of emergency vehicles.

2. Description of Prior Art

For emergency vehicles to arrive at their destinations promptly, it is necessary for them to have minimal interaction with other vehicles on the road. Traffic laws require that the drivers of non-emergency vehicles slow down, promptly pull over to the side of the road, and stop when they hear the sirens of emergency vehicles, to allow them to quickly travel to and from their emergency destinations. However, many motorists do not slow down and cause the emergency vehicles to be delayed. Some motorists have trouble hearing emergency vehicle sirens due to the use of electronic devices during travel, such as radios, tape players, and telephones. Other motorists have minor hearing loss, which although insufficient to prevent them from driving, is adequate to prevent them from promptly responding to emergency vehicle sirens, particularly when in addition they are listening to sounds from an electronic device as they drive. Other motorists who are in a hurry may not hear the emergency vehicle sirens at all, or will hear them but not slow down until they determine that the emergency vehicle is in their lane of traffic and overtaking them. Sometimes when such motorists pull over to the side of the road at the last minute, they will cause delay of an emergency vehicle. Also, when a motorist first hears emergency vehicle sirens but cannot see them to determine their direction of travel, the motorist's attention is temporarily diverted from away driving, until he or she visually locates the emergency vehicle and assesses its proximity. This temporary distraction of motorists has the potential for causing accidents and injury. The present invention solves the above-mentioned problems by providing a two-stage vehicle alert system that visually notifies motorists of approaching emergency vehicles. It comprises a vehicle-mounted transmitting unit in each emergency vehicle used within a community and ground-based receiving units positioned centrally within intersections more commonly used by emergency vehicles. Since motorists must continually look beyond the front of their vehicle to properly guide their vehicle through traffic, the ground-based units of the present invention are positioned within the normal field of vision of each motorist for optimum motorist response. The present invention also provides a two-stage warning for motorists, the first stage alerting motorists and nearby pedestrians that an emergency vehicle is approaching. Should the emergency vehicle stop or divert its direction of travel and turn prior to reaching a given intersection, the ground-based unit in that intersection would then cease to function and again assume its inactive state. However, should an emergency vehicle continue to approach the intersection and come within a predetermined distance from it, the ground-based unit would enter its second stage and rise from the pavement sufficiently to expose additional warning lights that would indicate an urgency for motorists to immediately pull over to the side of the road and stop. Although stationary traffic indicators and lighting units positioned within road surfaces are known for use in roadway intersections and at airports, it is not known to have a two-stage warning system comprising a wireless signal transmitting unit mounted within each emergency vehicle operating within a community and a ground-based signal receiving unit centrally positioned within the road surface of each intersection routinely traveled by the emergency vehicles, each receiving unit comprising an upwardly mobile strobe light assembly to alert surface vehicles and pedestrians near the intersection to the approach of emergency vehicles.

SUMMARY OF INVENTION—OBJECTS AND ADVANTAGES

The primary object of the present invention is to provide municipalities with an effective means for reducing the number of accidents and injuries involving emergency vehicles in transit to and from emergency destinations, which routinely must hurry though busy intersections against traffic lights to effectively perform their function, and thus have the potential of endangering individuals who might not otherwise be fully aware of their approach. It is also an object of this invention to increase the response time for emergency vehicles to emergency destinations by providing an effective means for forewarning both vehicular and pedestrian traffic at intersections of the approach of emergency vehicles so that all non-emergency vehicles will have time to safely move aside and give emergency vehicles optimum passage through intersections. A further object of this invention is to provide a traffic alert system positioned directly in front of motorists entering an intersection from any direction, which is within their normal field of vision, and which easily attracts their attention and quickly alerts them to the approach of emergency vehicles. It is also an object of this invention to provide a traffic alert system with convenient access to its components to facilitate system maintenance, such as the replacement of light bulbs and batteries. A further object of this invention is to provide a small, compact warning system that is sufficiently simple in construction and made from inexpensive yet rugged materials for widespread use by communities for reducing the number of accidents and injuries involving emergency vehicles as they hurry through intersections against traffic lights while en route to emergency destinations.

As described herein, properly manufactured and used, the present invention would provide a two-stage traffic alert system to visually alert pedestrians and surface vehicles at roadway intersections to the approach of emergency vehicles. The advance warning provided by the present invention would give motorists and pedestrians ample time to react to the approach of emergency vehicles and thereby allow optimum passage of emergency vehicles through intersections. The present invention comprises a plurality of vehicle-mounted, wireless signal transmitting units, one attached to every emergency vehicle in use within a community, and a plurality of ground-based signal receiving units each having a strobe light assembly attached thereto and each of which is mounted centrally within the pavement of an intersection routinely traveled by emergency vehicles. The transmitting units would each be set to emit a signal at a predetermined frequency. When emergency vehicles approach an intersection having the present invention, its signal transmitter would automatically emit signals at the frequency designated for receipt by the ground base assemblies. Means would be provided within the vehicle, in a position convenient to the driver, for manual override of the signal transmitter so that depending upon the circumstance, the transmitter could be activated sooner or later than would occur as a result of the automated activation means, or not at all. Upon receipt of the signal from the transmitter, a strobe light in the top of the ground-based assembly is actuated, providing an upwardly directed attention attracting, flashing light beam which is visible from all directions. This comprises the first stage of the traffic alert system which warns vehicle occupants and pedestrians that an emergency vehicle is within a predetermined distance from the intersection and heading toward it. Although the pre-set distance can vary, it is contemplated in the preferred embodiment that the first stage of the present invention be initiated when the emergency vehicle is within two or three blocks of the intersection into which it is placed. Should the emergency vehicle stop or otherwise divert its direction of travel prior to reaching the intersection, the top strobe light would cease to emit its flashing light beam. Should the emergency vehicle continue to approach a ground-based assembly of the present invention, the second stage of the traffic alert system would then be initiated, either by a time delay command based on the time of receipt of the first signal, or as a result of a change in signal frequency in the signals emitted by the transmitter as the emergency vehicle approaches the intersection having the ground-based assembly. Following second stage initiation, the ground-based assembly would rise vertically from the pavement surface and a plurality of side-mounted strobe lights would be revealed and activated. In the preferred embodiment it is contemplated to have at least two side mounted strobe lights facing each direction of traffic. The second stage, with its additional strobe lights being activated, would be more attention attracting to both motorists and pedestrians and an indication to them that emergency vehicles will actually pass through the intersection directly in front of them, making it mandatory that they immediately pull over and stop to allow the emergency vehicles optimum passage through the intersection. Since each ground-based assembly rises vertically, above the pavement surface as the emergency vehicle nears the intersection, the ground-based assemblies would be made of a sturdy, durable material, such as a ceramic material, that could withstand repeated impact with vehicle tires and survive long-term exposure to the elements with minimal maintenance. Central placement within the intersections would position the ground-based assemblies where they would only occasionally be impacted by vehicle tires. The ground-based assemblies would also be configured to temporarily retract into the pavement in the event of a vehicle impact. Each ground-based assembly would be powered by an electric cable connected between it and a nearby power pole, the cable being embedded within the pavement during installation. Each ground-based unit would alternatively be powered by a back-up system comprising rechargeable batteries that could be recharged by an electrical or solar panel source, as needed. It is contemplated for the preferred embodiment of the signal transmitter to be powered by replaceable batteries and to have means readily visible to an operator for determining that the batteries do not have sufficient stored power for effective operation.

In addition, it is contemplated for the present invention to be used as a warning to motorists of traffic light failure within an intersection. The batteries in the ground-based units of the present invention would allow them to function in the absence of electrical power. A sensor monitoring electrical current to the traffic light could be connected to the present invention which would cause initiation of the first stage of the present invention in the event of electrical power failure of the traffic light. First stage operation could also be used to assist emergency personnel working within an intersection to alert approaching motorists to a potential danger. Such operation would be particularly helpful during adverse weather conditions and could be initiated by the emergency personnel using a manual switch located on a power pole adjacent to the intersection.

The description herein provides the preferred embodiments of the present invention but should not be construed as limiting the scope of traffic alert system. For example, variations in the number of strobe lights used, the transmitted frequencies used, the materials from which the ground-based assembly and the signal transmitter are made, the dimensions and configurations of the ground-based assembly and the signal transmitter housings as long as they are easy to install and provide easy access to internal components, the type of thermal insulation used to protect the ground-based assembly, the type of heating units used to keep the ground-based assemblies from freezing in cold climates, and the source of power used for the traffic alert system, other than those shown and described herein, may be incorporated into the present invention. Thus, the scope of the present invention should be determined by the appended claims and their legal equivalents, rather than the examples given.

BRIEF DESCRIPTION OF THE DRAWINGS

FIG. 3 is a top view of a roadway intersection into which one of the ground-based signal receiving and strobe light assemblies of the present invention is centrally positioned.

FIG. 4 is a top view of a roadway intersection into which several of the ground-based signal receiving and strobe light assemblies of the present invention are centrally positioned.

FIG. 5 is a perspective view of the signal transmitter mounted on the dashboard of an emergency vehicle headed toward a roadway intersection within which one of the ground-based signal receiving and strobe light assemblies is positioned.

DETAILED DESCRIPTION OF PREFERRED EMBODIMENTS

Figure 1:
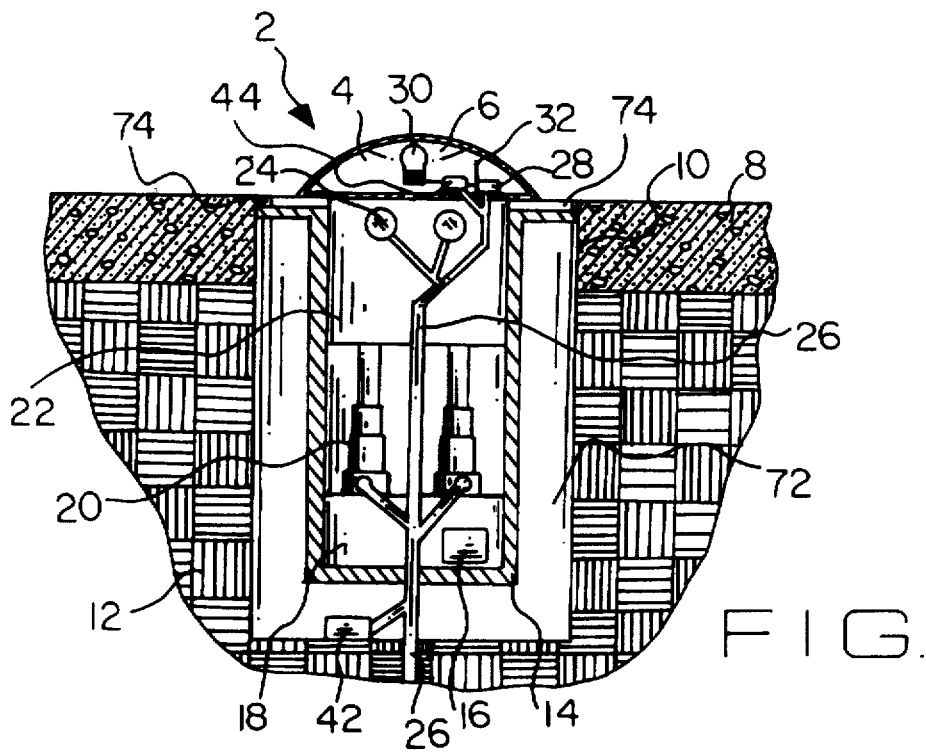
FIG. 1 is a side view of the ground-based signal receiving and strobe light assembly, shown in its lowered, inactive first stage position.
Figure 2:
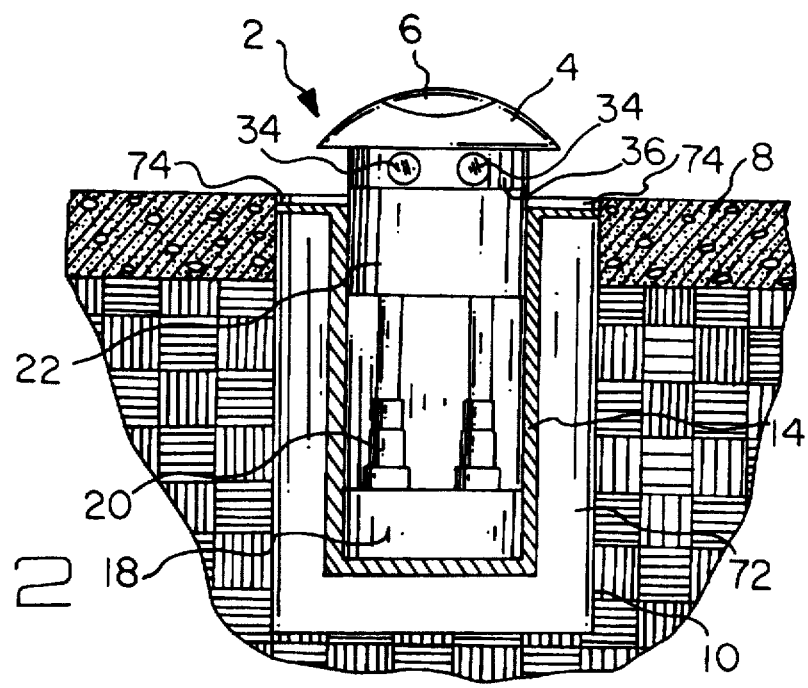
FIG. 2 is a side view of the ground-based signal receiving and strobe light assembly shown in its raised, second stage position.

The preferred embodiment of the traffic alert system of the present invention comprises at least one ground-based signal receiver and strobe light assembly, shown in FIGS. 1–5 as number 2, for insertion within the pavement 8 of a roadway intersection, shown in FIGS. 3 and 4 as number 38, and at least one vehicle-mounted, wireless signal transmitter, shown in FIG. 5 as number 46, for installation within an emergency vehicle, shown in FIG. 5 as number 50. FIGS. 1 and 2 show the preferred embodiment of ground-based assembly 2 during first stage alert and second stage alert, respectively. FIG. 1 also illustrates ground-based assembly 2 as it would appear in its retracted, inactive state. In FIG. 1, ground-based assembly 2 comprises a dome 4, an outer housing 10, and an upper movable housing 22 which together encase most of the electrical components of ground-based assembly 2. FIG. 1 shows ground-based assembly 2 mounted within a section of pavement 8 such that outer housing 10 is located beneath the surface of pavement 8 with dome 4 positioned above the surface of pavement 8 when the present invention is in its inactive state, as well as during first stage alert. As shown in FIG. 1, when ground-based assembly 2 is in its inactive state prior to first stage alert, the lower surface of dome 4 is flush with the surface of pavement 8. As shown in FIG. 2, when second stage operation of ground-based assembly 2 is initiated, dome 4 and upper movable housing 22 translate vertically a predetermined distance above the surface of pavement 8. In the preferred embodiment this distance is less than six inches, preferably the minimum distance necessary to expose side strobe lights 34, shown in FIG. 2.

In the preferred embodiment shown in FIGS. 1 and 2, dome 4 has a hemispherical configuration. It is contemplated for dome 4 to be made from strong, durable material, such as a ceramic material, in order to withstand long-term exposure to the elements and to survive repeated vehicle impact with minimal maintenance. The configuration of dome 4 is not critical to the present invention, however, when ground-based assembly 2 is inactive, the height of dome 4 must not pose a hazard to vehicles, such as non-emergency vehicle 66 shown in FIG. 5, traveling through intersection 38. Dome 4 contains an upper strobe light 30 which when activated catches the attention of motorists, such as the motorist shown in FIG. 5 as number 68, as emergency vehicles 50 approach intersection 38. In the preferred embodiment it is contemplated for the top of dome 4 to have a transparent portion 6 to allow the light from upper strobe light 30 to penetrate through the upper surface of dome 4. A signal receiver 28 with an antenna 32 attached thereto is also located within dome 4. FIG. 1 further shows a controller 44 positioned within dome 4 to accept incoming electrical signals (not shown) and transmit corresponding electrical signals required to initiate operation of various components of ground-based assembly 2. Receiver 28 is used to receive wireless signals (not shown) of a predetermined frequency from transmitter 46. Upon receipt of a wireless transmitted signal, upper strobe light 30 is activated and shines through transparent portion 6 thus alerting motorist 68 and pedestrians, such as the pedestrian shown in FIG. 5 as number 64, to the approach of emergency vehicles 50.

In the preferred embodiments shown in FIGS. 1 and 2, outer housing 10 comprises a stationary canister, preferably cylindrical or rectangular, that encases the portion of ground-based assembly 2 located beneath pavement 8 including a battery pack 16, a mechanical lifting device 20, a heating strip 42, and electrical wiring 26. It is also contemplated in the preferred embodiment of the present invention for outer housing 10 to be insulated to help protect ground-based assembly 2 during extremely cold weather. It is contemplated for ground 12 beneath pavement 8 to be compactly pressed against the outer surface of outer housing 10 while the inner surface of outer housing 10 is spaced apart from the outside surface of an inner housing 14. Space 72 between outer housing 10 and inner housing 14 provides an insulating advantage for mechanical lifting device 20 and movable housing 22 to further ensure their operation during extremely cold weather conditions. In the preferred embodiment battery pack 16 would be located within a lower compartment 18 of inner housing 14. It is contemplated for battery pack 16 to be recharged by electrical or solar powered means (not shown), as needed for long-term use without replacement or maintenance. Mechanical lifting device 20 resides between the top surface of lower compartment 18 and the lower surface of upper movable housing 22 and provides the means for lifting dome 4 and a portion of movable housing 22 above the surface of pavement 8 during second stage alert. At least one heating strip 42 is positioned within space 72 to protect ground-based assembly 2 from snow and cold weather. Heating strip 42 should produce sufficient heat to melt snow above dome 4 so that snow will not impede operation of the present invention during second stage alert, nor produce an obstacle to prevent the present invention from being seen by motorist 68. In warm climates heating strip 42 could be omitted. Also, although not shown, a temperature sensor could be used to cause controller 44 to inactivate heating strip 42 during warm weather when it would not be required. A gasket 74 located on the top lip surface of outer housing 10 would protect ground-based assembly 2 from water and dirt penetration. Electrical wiring 26 connects battery pack 16 to other components within ground-based assembly 2, including controller 44, to provide power to top strobe light 30, side strobe lights 34, heating strip 42, receiver 28, and mechanical lifting device 20, and to allow battery pack 16 to receive power from a recharging source (not shown), as needed.

In the preferred embodiments shown in FIGS. 1 and 2, movable housing 22 comprises a canister, preferably cylindrical or rectangular, made from a durable, sturdy material, such as a ceramic material, that can withstand long-term exposure to temperature extremes, however, the configuration of movable housing 22 and the type of materials used to construct it are not critical to the present invention. Movable housing 22 is positioned beneath dome 4 and configured to closely fit within inner housing 14. Movable housing 22 also comprises several side strobe lights 34 which are used during second stage alert to warn pedestrian 64 and motorist 68 to the approach of emergency vehicle 50. It is contemplated for movable housing 22 to contain a sufficient number of side strobe lights 34 so that the present invention is equally visible from all directions. In the preferred embodiment it is contemplated to have at least two side strobe lights 34 visible on each side of movable housing 22 so that if one fails to operate, the other would still be visible to motorist 68 and pedestrian 64 and provide necessary warnings. In the preferred embodiment, although not critical, it is contemplated for the upper half of movable housing 22 to comprise a transparent band 36 to allow light from side strobe lights 34 to penetrate the surface of movable housing 22 and thus alert motorist 68 and pedestrian 64 to the approach of emergency vehicle 50. In the alternative, movable housing 22 could have individual windows 24 in front of each side strobe light 34 to allow light from side strobe lights 34 to penetrate through movable housing 22. It is also envisioned in the present invention for transparent band 36 and transparent portion 6 to comprise color pigments to provide a color contrast and thereby improve visibility of the present invention during snow conditions.

As shown in FIGS. 3 and 4, it is contemplated for ground-based assembly 2 to be permanently, mounted within pavement 8 of an intersection 38. The number of ground-based assemblies 2 used in the traffic alert system is not critical and would depend upon the size of intersection 38 and the amount of traffic typically traveling through each intersection 38. For example, FIG. 3 illustrates a relatively small intersection 38 with one lane of traffic in each direction, thus only one ground-based assembly 2 would be required to adequately alert pedestrian 64 and motorist 68 to the approach of emergency vehicle 50. FIG. 4 shows a larger intersection 38 having three lanes of traffic in each direction. It is envisioned that intersection 38, as shown in FIG. 4, would require approximately five ground-based assemblies 2 to adequately alert pedestrian 64 and motorist 68 to the approach of emergency vehicle 50. Also shown in FIGS. 3 and 4 is a support pole 40 located on one corner of intersection 38. Support pole 40 would provide electrical power (not shown) to ground-based assembly 2 and would have a manual override switch 62 for use by emergency personnel (not shown) to employ the present invention to help alert motorist 68 to the presence of emergency personnel working within intersection 38, and other specialized needs.

FIG. 5 shows transmitter 46 located on the dashboard of emergency vehicle 50 to the right of steering wheel 52 and in the line of sight between the driver (not shown) of emergency vehicle 50 and intersection 38. Although the exact placement of transmitter within emergency vehicle 50 is not critical, transmitter 46 should always remain within easy reach of personnel (not shown) within emergency vehicle 50. Also, although FIG. 5 shows transmitter 46 as a small rectangular device with control buttons 48 connected through its outer surface and an antenna 70 connected thereto, the configuration and dimensions of transmitter 46 are not critical. In the preferred embodiment of the present invention, although not shown, it is contemplated for transmitter 46 to be battery powered. When transmitter 46 is activated, transmitter 46 will automatically send a signal (not shown) of a predetermined frequency forwardly from emergency vehicle 50 to initiate first stage alert of ground-based assembly 2 while emergency vehicle 50 is en route to an emergency destination. It is contemplated for one control button 48 on transmitter 46 to be a manual override control which can be used by the driver of emergency vehicle 50 to override the automatic signal activation of ground-based assembly 2, as needed. Second stage alert, involving the lifting of movable housing 22 and the activation of side strobe lights 34, can be initiated by one of several alternative means, such as transmitter 46 emitting a second, different frequency signal toward ground-based assembly 2 as emergency vehicle 50 comes within a second predetermined distance from intersection 38, or through use of a time delay command based on the time of receipt of the first signal. FIG. 5 also shows a rearview mirror 54 positioned within emergency vehicle 50, a center roadway median 56 at the edge of intersection 38, lane markings 58 for use by motorized vehicle 66, one corner 60 adjacent to intersection 38 having a power pole 40 situated thereon with an emergency manual override switch 62 connected to it, a pedestrian positioned on corner 60, and motorist 68 within vehicle 66 also positioned adjacent to intersection 38. Although not shown, restrictive means can be provided for manual override switch 62 so that it may only be accessed by emergency personnel.

During use, when ground-based assembly 2 is activated by transmitter 46 to initiate second stage operation, mechanical lifting device 20 would push upwards on the bottom surface of movable housing 22 to raise movable housing 22 and dome 4 several inches above the surface of pavement 8. This would allow upper strobe light 30 and side strobe lights 34 to become more visible to pedestrian 64 and motorist 68. Ground-based assembly 2 would remain raised above the surface of pavement 8 until emergency vehicle 50 has safely cleared intersection 38, after which the lack of a transmitted signal (not shown) would cause ground-based assembly 2 to retract into its lowered position. When several ground-based assemblies 2 are used within the same large intersection 38, all ground-based assemblies 2 would be activated simultaneously and operate in unison to alert the public to the approach of emergency vehicle 50. Once emergency vehicle 50 has safely cleared intersection 38, the lack of a transmitted signal would cause all ground-based assemblies 2 to return to their lowered states simultaneously. Maintenance access to inner housing 14 should be easily achieved, and although not critical, could be provided by threaded means which directly connects dome 4 to movable housing 22 or through the use of screws or other fastening devices (not shown).

What is claimed is:

1. A traffic alert system to warn motorists and pedestrians of approaching emergency vehicles, said system comprising a plurality of wireless transmitting units and a plurality of ground-based assemblies, each of said transmitting units comprising a transmitter housing having a hollow interior, wireless signal emitting means for emitting a signal at a designated frequency, said signal emitting means being positioned within said transmitter housing, a transmitter antenna, a transmitter power source, and a first quantity of electrical wiring to interconnect said antenna with said signal emitting means and said power source, and each of said ground-based assemblies comprising a dome, an outer housing positioned beneath said dome, an inner housing positioned within said outer housing, an upper movable housing positioned within said inner housing, said upper movable housing having an upper portion and being connected to said dome, at least one upper strobe light positioned within said dome, a plurality of side strobe lights positioned within said upper portion of said upper movable housing, mechanical lifting means positioned underneath said upper movable housing between said upper movable housing and said inner housing, said mechanical lifting means capable of lifting said dome between a raised position and a lowered position, a signal receiver able to receive signals emitted by said wireless signal emitting means, an antenna connected to said signal receiver, a controller connected between said signal receiver, said upper strobe light, said side strobe lights, said mechanical lifting means, a power supply connected to said controller, and a second quantity of electrical wiring connected between said antenna, said signal receiver, said controller, said upper strobe light, said side strobe lights, said mechanical lifting means, and said power supply, wherein when one of said transmitting units is positioned within each emergency vehicle within a community and at least one of said ground-based assemblies are centrally positioned with the roadway surface of each intersection commonly traveled by said emergency vehicles, each of said transmitting units can automatically initiate said upper strobe light, said side strobe lights, and vertical movement of said movable housing within said ground-based assembly to warn motorists and pedestrians of the approach of said emergency vehicles.

2. The system of claim 1 wherein said controller is configured to cause initiation of said upper strobe light in a first stage of operation, said controller is also configured to cause initiation of said side strobe lights and vertical movement of said upper movable housing in a second stage of operation, and activation means to activate said controller to cause said first stage and said second stage of operation.

3. The system of claim 1 wherein said activation means is chosen from a group consisting of frequency controlling means to cause said transmitter to emit signals of different frequencies and time delay command means.

4. The system of claim 1 further comprising a lower compartment in said inner housing and wherein a back-up power source is positioned within said lower compartment.

5. The system of claim 1 wherein said outer housing is thermally insulated.

6. The system of claim 5 further comprising a heating strip connected to said outer housing to help keep said system operational in extremely cold weather.

7. The system of claim 1 wherein said upper movable housing is connected to said mechanical lifting means so that when said dome is in a raised position and a downward force is exerted on said dome, said upper movable housing is caused to move downwardly into said inner housing and temporarily lower said dome until said downward force is no longer in contact with said dome.

8. The system of claim 1 wherein said dome has a centrally positioned transparent portion and said upper portion of said upper movable housing has a transparent band, said transparent portion allowing light from said upper strobe light to be visible to nearby pedestrians and motorists and said transparent band allowing light from said side strobe lights to be visible to nearby pedestrians and motorists.

9. The system of claim 8 wherein said transparent portion and said transparent band are made from colored materials for better visibility of light emitted by said upper strobe light and said side strobe lights during winter.

10. The system of claim 1 wherein said dome has a centrally positioned transparent portion and said upper portion of said upper movable housing has a plurality of transparent windows, said transparent portion allowing light from said upper strobe light to be visible to nearby pedestrians and motorists and said transparent windows each allowing light from one of said side strobe lights to be visible to nearby pedestrians and motorists.

11. The system of claim 10 wherein said transparent portion and said transparent windows are made from colored materials for better visibility of light emitted by said upper strobe light and said side strobe lights during winter.

12. The system of claim 1 wherein said power supply comprises a remote alternating current power source and a rechargeable back-up power source, said remote alternating current power source being connected with said electrical wiring to said controller, and said rechargeable back-up power source being positioned within said inner housing and also connected to said controller.

13. The system of claim 1 further comprising a first manual override switch connected to said signal transmitter and positioned through said transmitter housing, and a second manual override switch connected to said controller and positioned remotely from said outer housing for use by emergency personnel.

14. The system of claim 1 further comprising a gasket positioned between said dome and said outer housing to minimize water and dirt penetration into said outer housing.

15. A method for alerting pedestrians and motorists to the approach of emergency vehicles toward roadway intersections, said method comprising the steps of providing a plurality of emergency vehicles, a plurality of signal transmitting units, a plurality of domes, a plurality of outer housings, a plurality of inner housings, a plurality of upper movable housings, a plurality of mechanical lifting devices, a plurality of signal receivers, a plurality of controllers, a plurality of antennae, a plurality of power supplies, a plurality of roadway intersections, and a quantity of electrical wiring; positioning each of said signal transmitting units within one of said emergency vehicles within easy reach of a person driving said emergency vehicle; positioning one of said antennae, one of said signal receivers, and one of said controllers into each of said domes; connecting each of said domes to the upper surface of one of said upper movable housings; positioning each of said mechanical lifting devices within one of said inner housings; positioning each of said upper movable housings within one of said inner housings above said mechanical lifting device and in contact with said mechanical lifting device; centrally positioning each outer housings of said signal receiving units within one of said roadway intersections; positioning each of said inner housings within one of said outer housings; connecting said controller to said signal receiver, said mechanical lifting device, and said power supply with said electrical wiring; moving one of said emergency vehicles toward one of said roadway intersections; initiating said signal transmitting unit to cause said upper strobe light to activate in a first stage of operation that alerts pedestrians and motorists to the distant approach of one of said emergency vehicles; initiating said signal transmitting one unit to cause said upper movable housing to move upwardly to a raised position and cause said side strobe lights to activate in a second stage of operation to alert pedestrians and motorists to the close approach of one of said emergency vehicles to help prevent pedestrians and motorists from interacting with said emergency vehicle to provide for faster and safer passage of said emergency vehicle through said roadway intersections.

16. The method of claim 15 wherein said step of providing a plurality of upper movable housings further comprises the step of providing upper movable housings each having an upper portion and a plurality of transparent windows in said upper portion.

17. The method of claim 15 wherein said step of providing a plurality of upper movable housings further comprises the step of providing upper movable housings each having an upper portion and a transparent band around said upper portion.

18. The method of claim 15 wherein said step of providing a plurality of domes further comprises the step of providing domes each having a centrally positioned transparent portion.

19. The method of claim 15 wherein said step of connecting said inner housing to said mechanical lifting device further comprises the step of connecting said inner housing to said mechanical lifting device so that when said dome is in a raised position and a downward force is exerted on said dome, said upper movable housing is caused to move downwardly into said inner housing and temporarily lower said dome until said downward force is no longer in contact with said dome.

* * * * *